United States Patent [19]

Leribaux

[11] Patent Number: 4,461,816

[45] Date of Patent: Jul. 24, 1984

[54] SOLID LITHIUM NITRIDE ELECTROLYTE BATTERY COMPRISING LITHIUM ALLOY ANODE

[75] Inventor: Henri R. Leribaux, Dilbeek, Belgium

[73] Assignee: Agence Spatiale Europeenne, Paris, France

[21] Appl. No.: 426,906

[22] Filed: Sep. 29, 1982

[30] Foreign Application Priority Data

Sep. 30, 1981 [FR] France .................. 81 18386

[51] Int. Cl.³ .......................... H01M 6/18
[52] U.S. Cl. ..................... 429/191; 429/218
[58] Field of Search .............. 204/195 S; 429/191, 429/33, 218, 406, 409

[56] References Cited

U.S. PATENT DOCUMENTS

| | | | |
|---|---|---|---|
| 3,506,492 | 4/1970 | Buzzelli et al. | 429/104 |
| 3,898,096 | 8/1975 | Heredy et al. | 429/112 X |
| 3,933,520 | 1/1976 | Gay | 429/103 |
| 3,992,222 | 11/1976 | Walsh | 429/112 X |
| 4,011,372 | 3/1977 | Tomczuk | 429/218 |
| 4,234,554 | 11/1980 | Rabenau et al. | 429/191 X |

FOREIGN PATENT DOCUMENTS

| | | |
|---|---|---|
| 2232841 | 1/1975 | France . |
| 2389247 | 11/1978 | France . |
| 2408548 | 6/1979 | France . |
| 2414253 | 8/1979 | France . |
| 2048839 | 12/1980 | United Kingdom ............ 429/191 |

OTHER PUBLICATIONS

M. Stapley Whittingham et al., "A Mixed Rate Cathode for Lithium Batteries," J. Electrochem. Soc., vol. 128:2, pp. 485-486, (Feb. 1981).

Primary Examiner—Anthony Skapars
Attorney, Agent, or Firm—Oblon, Fisher, Spivak, McClelland & Maier

[57] ABSTRACT

The present invention discloses an electrochemical generator which comprises an anode formed from an alloy comprising 65 to 85% of lithium and 15 to 35% of lead or a mixture of lead and tin and a cathode formed of a material capable of undergoing intercalation reactions while reacting with lithium, and having a solid electrolyte which contains lithium nitride impregnated in a resinous matrix.

12 Claims, 1 Drawing Figure

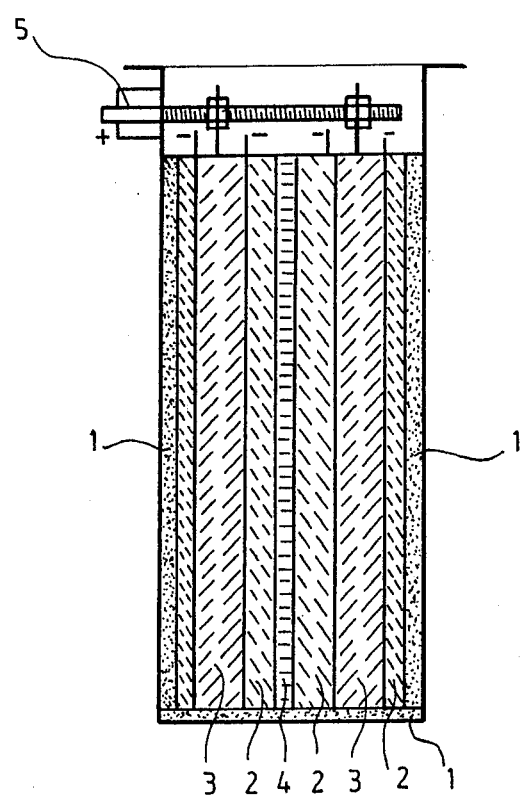

SOLID LITHIUM NITRIDE ELECTROLYTE BATTERY COMPRISING LITHIUM ALLOY ANODE

BACKGROUND OF THE INVENTION

1. Field of the Invention

The present invention relates to an improvement in electrochemical generators such as cells and batteries, which are characterized by high specific energy and further, to a process for manufacturing the same.

2. Description of the Prior Art

It has been recognized that it is desirable to develop cells having a high energy per unit of mass, i.e. a high level of energy density per unit of mass (and per unit of volume). This recognition has led to the use of alkaline metals and in particular of lithium, as anodes for such cells. For instance, it is known to provide cells based on the following anode/cathode systems:

Cu S - Li
Cu Cl - Li
$Ag_2S$ - Li
Ag Cl - Li
$Ag_2 CrO_4$ - Li
etc.

These systems are recognized to provide high energy per unit volume, and are therefore particularly advantageous for manufacturing miniature cells. Other pairs, such as LiAl - Fe S, are only effective at very high temperatures, which limit their cycling performance.

The art has also introduced batteries containing solid electrolytes, which have overcome the well known difficulties commonly associated with cells containing aqueous or organic solvents. For instance, with solid state electrolytes there is no difficulty in sealing of the elements, or in thermodynamic instability of the anodes with respect to the solvents. Good solid electrolytes are generally characterized by having a maximum ionic conductivity and a minimum electronic conductivity. All the research work being at present carried out aims at optimizing these two of contradictory parameters.

Furthermore, the introduction on the market of some solid electrolytes based on lithium compounds (see particularly French Patent application No. 80-10531) has made it possible to lower the internal temperature of the cells, thereby making possible lower operating temperatures, which, in turn, permit new lithium based alloys to be used as the anode. Several cells with solid electrolyte and lithium anode are at present in use, but, in general, although cells with a high energy density may be obtained, these cells are limited in the amount of current which can be produced. Therefore, a need has continued to exist for an electrochemical generator having a high current density.

BRIEF DESCRIPTION OF THE DRAWING

The present invention will be understood by reference to the following drawing and from the following description which refers to the accompanying drawing in which:

The single FIGURE represents a four-element electrochemical generator.

It should be understood, however, that this drawing and the corresponding descriptive parts are given solely by way of illustration of the subject of the present invention.

SUMMARY OF THE INVENTION

It is, therefore, an object of this invention to provide electrochemical generators, such as cells and batteries, containing an electrolyte having maximum ion conductivity and minimum electronic conductivity.

It is a further object of this invention to provide electrochemical generators, such as cells and batteries, which operate at temperatures lower than currently in use.

It is yet a further object of this invention to provide electrochemical generators, such as cells and batteries, which have a high energy output per unit of mass.

It is yet a further object of this invention to provide electrochemical generators, such as cells and batteries, which are capable of producing a large current.

These and other objects of the invention, as will hereinafter become more readily apparent, have been accomplished by an electrochemical generator which comprises an anode formed from an alloy comprising 65 to 85% of lithium and 15 to 35% of lead or a mixture of lead and tin and a cathode formed of a material capable of undergoing intercalation reactions while reacting with lithium, and having a solid electrolyte which contains lithium nitride impregnated in a resinous matrix.

DETAILED DESCRIPTION OF THE PREFERRED EMBODIMENT

The anode of the present invention comprises an alloy of lithium, said alloy containing 65 to 85% lithium and 15 to 35% of lead or a lead-tin alloy. A more preferred anode composition range is 70 to 80% lithium and 20 to 30% of the lead or lead-tin alloy. A preferred embodiment of this invention utilizes an anode which is an alloy of 79% lithium and 21% lead.

The cathode of this invention may be any of the known cathode materials capable of undergoing an intercalation reaction with lithium such as oxides, transition metal sulfides, or mixture thereof. Such materials include, but are not limited to, $TiS_2$, $MoS_3$, $MoO_3$, $NiPS_3$, $NiS_2$, $FeS_2$, $TiS_2$-$MoS_3$ mixtures containing 80 mole % $TiS_2$, and $NiS_2$-$FeS_2$ mixtures containing 40% $NiS_2$ and 60% $FeS_2$. The $TiS_2$-$MoS_3$ mixture and the $NiS_2$-$FeS_2$ mixture are preferred cathode materials.

According to the invention, the materials forming the cathode may be intimately mixed with 1 to 6% of their weight of molybdenum powder and/or a polyfluoronated resin such as polytetrafluoroethylene.

The solid electrolyte of this invention contains, as the active ingredient, $LiN_3$. The $LiN_3$ may be used in conjunction with a lithium halide such as lithium chloride, lithium bromide or lithium iodide. The electrolyte formed of $Li_{1.8} N_{0.4} Cl_{0.6}$ (or $Li_{1.2} N_{0.4}+Li_{0.6} Cl_{0.6}$) having an ionic conductivity close to $1\times10^{-2}$ (ohm - cm) measured at 200° C. (the electrolyte described in French Patent application No. 80-10531 filed in the name of Max-Planck-Gesellschaft, previously mentioned) is perfectly suitable for the cells and batteries of the present invention.

The lithium nitride-containing electrolyte is further characterized in that said electrolyte is impregnated in a resinous matrix. Suitable resinous matrices include, but are not limited to, polyolefins and polytetrafluoroethylene.

According to an advantageous embodiment of the invention, the thickness of the layer of the electrolyte separating the electrodes is from 1 to 2 mm.

In accordance with the invention, the cathode and the anode are made from sintered materials filling the inside of a metal frame forming a collector and support for the connection terminals.

This invention contemplates electrochemical generators containing multiple anode/cathode units wired in series. According to a preferred embodiment of the invention and so as to have the best energy/weight ratio, the electrochemical generators of the invention are formed of four-element units, i.e. of four pairs of positive electrodes and four pairs of negative electrodes.

The present invention also relates to a process for manufacturing the electrochemical generators of the invention, characterized in that:

(a) the anodes are prepared by filling the metal frame with lithium alloy, so as to have a perfectly flat contact surface and a final porosity of the order of 30%;

(b) the cathodes are formed by pressing the constituents thereof, for 10 to 30 minutes, in a current collector frame provided with a molybdenum separator under a pressure of about 40 bars at a temperature of the order of 400° C.;

(c) the electrolyte is prepared by impregnating and/or coating its active constituents with about 20% of plastic material (polyolefin or polyfluorinated resin) and subjecting it to a pressure of about 500 bars and at a temperature of the order of 200° C. in an inert gas atmosphere.

According to one embodiment of this process of the invention, the anode is formed by molding the molten lithium alloy at 700°–800° C.

According to another particularly advantageous embodiment of the process of the present invention, the anode is prepared by reducing first of all the lithium alloy to a fine powder (particle size: 200 to 500 microns), then subjecting this powder, placed beforehand by mechanical vibration in an appropriate metal frame, to a pressure of about 30 bars at about 200° C. for 5 to 15 minutes.

Having now generally described this invention, the same will be better understood by reference to certain specific examples, which are included herein for purposes of illustration only and are not intended to be limiting of the invention or any embodiment thereof, unless specified.

EXAMPLE

As shown in the drawing, the four-element battery, i.e. with four pairs of positive and negative electrodes, in accordance with the present invention, has for example the following dimensions:

23.6 cm × 23.6 cm × 4.5 cm and required for its construction:

1650 g of 79 Li-21 Pb alloy (anodes)
2600 g of $TiS_2$-$MoS_3$ (cathodes)
1400 g of stainless steel
800 g of current collector
400 g of alumina
200 g of electrolyte The alumina ceramic 1 (5 sheets 3 mm in thickness) is intended for insulating the electrodes 2 and 3 from the case. The anode 2 is formed from a lithium-lead alloy containing 79% of lithium and 21% of lead; the cathode 3 is formed from a $TiS_2$-$MoS_3$ mixture containing 80% $TiS_2$ and 20% $MoS_3$, containing additionally, 1% by weight of the $TiS_2$-$MoS_3$ mixture of polytetrafluoroethylene.

A carbon felt spacer 4, 3 mm in thickness, is placed in the middle between two central electrodes. The two omnibus bars are shown at 5.

The weight of lithium present in this embodiment gives a theoretical capacity of 728 amp/hours. The specific energy of this generator (which weighs 7050 g) is 142 W hour/kg.

The invention now being fully described, it will be apparent to one of ordinary skill in the art that many changes and modifications can be made thereto without departing from the spirit or scope of the invention as set forth herein.

What is claimed as new and desired to be secured by Letters Patent of the United States is:

1. An electrochemical generator which comprises an anode formed from an alloy comprising 65 to 85% of lithium and 15 to 35% of lead or a mixture of lead and tin and a cathode formed of a material capable of undergoing intercalation reaction while reacting with lithium, and having a solid electrolyte which contains lithium nitride impregnated in a resinous matrix.

2. The electrochemical generator as claimed in claim 1, wherein the anode is formed form an alloy containing 79% of lithium and 21% of lead or a lead-tin alloy of a density close to 3.3 g/cm$^3$.

3. The electrochemical generator as claimed in claim 1, wherein the cathode is formed from a material chosen from the group which contains $TiS_2$, $MoS_3$, $MoO_3$, $NiPS_3$, $NiS_2$, $FeS_2$.

4. The electrochemical generator as claimed in claim 3, wherein the cathode is formed from a $TiS_2$-$MoS_3$ mixture containing about 80 mol % of $TiS_2$.

5. The electrochemical generator as claimed in claim 3, wherein the cathode is formed from an $NiS_2$-$FeS_2$ mixture in the molar proportion of 40% to 60% respectively.

6. The electrochemical generator as claimed in claim 1, wherein the materials forming the cathode may be intimately mixed with 1 to 6% of their weight of molybdenum powder or a mixture of molybdenum powder and a polyfluoronated resin.

7. The electrochemical generator as claimed in claim 1, wherein the plastic material for impregnation of the solid electrolyte is a polyolefin.

8. The electrochemical generator as claimed in claim 1, wherein the plastic material for impregnation of the electrolyte is polytetrafluoroethylene.

9. The electrochemical generator as claimed in claim 1, wherein the thickness of the layer of electrolyte separating the electrodes is 1 to 2 mm.

10. The electrochemical generator as claimed in claim 1, wherein the cathode and the anode are made from sintered materials filling the inside of a metal frame forming a collector and a support for the connection terminals.

11. The electrochemical generator as claimed in claim 1, formed from four-element units, comprising four pairs of positive electrodes and four pair of negative electrodes.

12. The electrochemical generator as claimed in claim 1, wherein the anode is formed from an alloy containing 70–80% of lithium and 20–30% of a lead or a mixture of lead and tin.

* * * * *